US007966105B2

(12) United States Patent
McAden

(10) Patent No.: US 7,966,105 B2
(45) Date of Patent: Jun. 21, 2011

(54) METHOD AND APPARATUS FOR POWER MANAGEMENT OF ASSET TRACKING SYSTEM

(75) Inventor: Mark McAden, Frisco, TX (US)

(73) Assignee: Asset Intelligence, LLC, Hackensack, NJ (US)

( * ) Notice: Subject to any disclaimer, the term of this patent is extended or adjusted under 35 U.S.C. 154(b) by 1094 days.

(21) Appl. No.: 11/402,199

(22) Filed: Apr. 11, 2006

(65) Prior Publication Data

US 2007/0239321 A1 Oct. 11, 2007

(51) Int. Cl.
*G06F 17/00* (2006.01)

(52) U.S. Cl. .......................................................... 701/1

(58) Field of Classification Search ................ 701/1, 45, 701/213; 455/456.1, 572
See application file for complete search history.

(56) References Cited

U.S. PATENT DOCUMENTS

| | | | | |
|---|---|---|---|---|
| 1,075,472 | A | 10/1913 | Hadaway, Jr. | |
| 3,894,773 | A * | 7/1975 | Cleveland et al. | 303/123 |
| 4,554,607 | A * | 11/1985 | Mora | 361/104 |
| 5,491,486 | A | 2/1996 | Welles, II et al. | |
| 5,578,877 | A | 11/1996 | Tiemann | |
| 5,719,771 | A | 2/1998 | Buck et al. | |
| 5,721,540 | A | 2/1998 | Ellis | |
| 5,917,433 | A * | 6/1999 | Keillor et al. | 340/989 |
| 6,067,044 | A | 5/2000 | Whelan et al. | |
| 6,069,570 | A | 5/2000 | Herring | |
| 6,104,978 | A | 8/2000 | Harrison et al. | |
| 6,281,797 | B1 | 8/2001 | Forster et al. | |
| 6,336,593 | B1 * | 1/2002 | Bhatnagar | 236/78 R |
| 6,553,336 | B1 | 4/2003 | Johnson et al. | |
| 6,611,755 | B1 | 8/2003 | Coffee et al. | |
| 6,919,803 | B2 | 7/2005 | Breed | |
| 6,975,308 | B1 * | 12/2005 | Bitetto et al. | 345/204 |
| 6,982,656 | B1 | 1/2006 | Coppinger et al. | |
| 7,455,225 | B1 * | 11/2008 | Hadfield et al. | 235/384 |
| 2003/0014256 | A1 * | 1/2003 | Pine et al. | 704/270 |
| 2003/0227382 | A1 * | 12/2003 | Breed | 340/539.13 |
| 2003/0233189 | A1 * | 12/2003 | Hsiao et al. | 701/207 |
| 2004/0034470 | A1 * | 2/2004 | Workman | 701/213 |
| 2004/0125014 | A1 | 7/2004 | Sun | |
| 2004/0246124 | A1 * | 12/2004 | Reilly et al. | 340/511 |
| 2004/0257276 | A1 | 12/2004 | Huston et al. | |
| 2006/0187026 | A1 * | 8/2006 | Kochis | 340/539.13 |
| 2006/0202809 | A1 | 9/2006 | Lane et al. | |
| 2007/0057779 | A1 * | 3/2007 | Battista et al. | 340/425.5 |
| 2007/0143207 | A1 * | 6/2007 | Breen | 705/40 |
| 2007/0155404 | A1 * | 7/2007 | Yamane et al. | 455/456.1 |

FOREIGN PATENT DOCUMENTS

| | | |
|---|---|---|
| WO | WO 95/29410 | 11/1995 |
| WO | WO 01/75472 A2 | 12/2001 |

* cited by examiner

*Primary Examiner* — Khoi Tran
*Assistant Examiner* — Rodney King
(74) *Attorney, Agent, or Firm* — Lowenstein Sandler PC

(57) ABSTRACT

A technique for controlling the state of a power supply in a mobile asset such as a cargo trailer. The technique detects motion status such as may be provided by a vibration sensor. The motion status signal is filtered by other signals, such as with inputs from a global positioning system sensor, and is then further used to select a power consumption mode. The power consumption mode may be further controlled based on configuration information that may indicate that a vibration source such as a refrigeration unit is present on the trailer.

20 Claims, 3 Drawing Sheets

METHOD AND APPARATUS FOR POWER MANAGEMENT OF ASSET TRACKING SYSTEM

BACKGROUND OF THE INVENTION

The present invention relates generally to the tracking of mobile assets such as cargo containers, and in particular to techniques for reducing power consumption.

The management of mobile assets is a major concern in various transportation businesses such as the trucking, railroad, and rental car industries. As one example, in the trucking industry, an asset manager must keep track of the status and location of both the tractors and the trailers in a fleet. The asset manager should know whether each trailer asset is in service (i.e. being transported by a tractor or other means) or out of service (i.e. not being transported by a tractor). The asset manager should also have similar information with respect to whether each tractor asset is hauling a trailer, or not present hauling anything. It should also be possible to monitor progress of each tractor and trailer so that the asset manager may develop a plan for scheduling purposes.

Systems for tracking and monitoring mobile assets for fleet management are therefore generally known in the art. These systems typically include various electronic sensors connected to monitor the asset, and wireless communication systems, used to report the asset status.

The sensors are typically installed within the tractor or cargo trailers in such as way that they can automatically monitor the status of each asset. One common type of sensor is one that determines the location of a unit, such as a Global Positioning System (GPS) receiver. Other sensors provide status on proper operating conditions (such as temperature), detect misuse (such as by detecting an unscheduled "door open" event) and otherwise monitor the progress of each tractor and trailer for scheduling and security purposes.

In the typical arrangement, the electronics package within a cargo trailer, for example, can include various sensors for determining status, a GPS unit for determining a location, and a cellular radio modem for reporting data concerning current position and status to a central location. When the trailer is in a tethered mode (that is, when it is connected to a tractor), the vehicle's electrical system provides ample current for powering these electronics. When a trailer is disconnected from the tractor (that is, in an untethered mode), power consumption can become an issue. A trailer may remain untethered for many hours, or days (even weeks) in a storage yard. Since such electronics are expected to continue to operate, even in the absence of available external power from a tractor, the electronics must typically draw current from a local battery. However, in order to avoid running down that local battery, such units will enter a low power mode until such time as vehicle motion is indicated by a GPS, accelerometer, or other motion sensor, that provide confirmation that the trailer is actually moving.

SUMMARY OF THE INVENTION

There are still problems when the battery is controlled by a motion sensor, even if inactivated only periodically. One problem occurs when the trailer sits for an extended period of time, causing the battery to eventually run down. While motion sensors can be used to reduce this problem somewhat, they do not eliminate it entirely.

One such problem occurs with certain types of trailers which have attached refrigeration ("reefer") units. Such reefer units may be utilized with trailers that are carrying food or other items which must remain refrigerated during transit. However, reefer units create vibrations within the trailer. Such vibrations may in turn trigger the motion sensor which causes the electronics to energize. This then causes the power controller to go into a full power mode, for at least some period of time, unevenly and repeatedly, even when the trailer is not actually moving.

In other words, when trailer refrigeration units are operating, vibrations occur that are capable of triggering commonly used motion sensors. The motion sensor may in turn activate one or more algorithms in the embedded trailer tracking or monitoring system, causing power to be drained from the battery.

Thus, a technique is needed for filtering vibrations that originate from a reefer that would otherwise trigger a motion sensor in a stationary, untethered trailer. This would avoid unnecessarily activating tracking electronics units to take GPS position fixes, operating the cellular mobile telephone, and so forth which otherwise consumes power unnecessarily.

In one preferred embodiment, the present invention is an apparatus for use in controlling the state of a power supply in a mobile asset such as a cargo trailer. The apparatus includes a motion sensor that provides an indication of movement and/or vibration in the trailer. The motion sensor output is subjected to filtering to qualify its output as actually being triggered by motion of the trailer, rather than being cause by vibration from equipment such as a reefer. The filter output indicates the beginning of a drive segment, called the In_Transit mode.

If a further motion test fails (for example, by several successive GPS fixes indicating that the trailer is in the same position) then further processing occurs to attempt to determine whether the trailer is configured for a reefer, or if the reefer unit is operating.

In the event that the trailer is configured for a reefer or the reefer indicates that is operating, then it is assumed that the motion sensor was triggered by the reefer. In this case, the motion sensor will be disabled for further processing, to enable the unit to remain in a low power mode.

If, however, the reefer unit indicates that it is not operating, or a configuration bit indicates that a reefer does not exist, then further processing is allowed to take place to detect consecutive failure events. If multiple failure events occur such that the motion sensor is triggering, but In_Transit mode is not, then a mode is entered in which the motion sensor is disabled from further processing. If, however, there are no further consecutive failures, then the unit returns to a low power mode, but with the motion sensor enabled.

In other words, if a power control monitor is continuously being triggered by a motion sensor, but the end result of a motion filter is not being satisfied, then unnecessary processing (i.e., unnecessary triggering of a GPS unit) is occurring. At that time, the motion sensor can be disabled until a future event occurs to signal that the motion sensor should be re-enabled. This future event can be either elapsed time or an external event, such as detecting that the unit is hooked up to tractor power.

Another way in which the motion sensor can be disabled is to directly monitor a refrigeration unit through an interface if such an interface is provided. If so, while the refrigeration unit is operating and an In_Transit mode is not detected, then the motion sensor can itself be disabled.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters reefer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
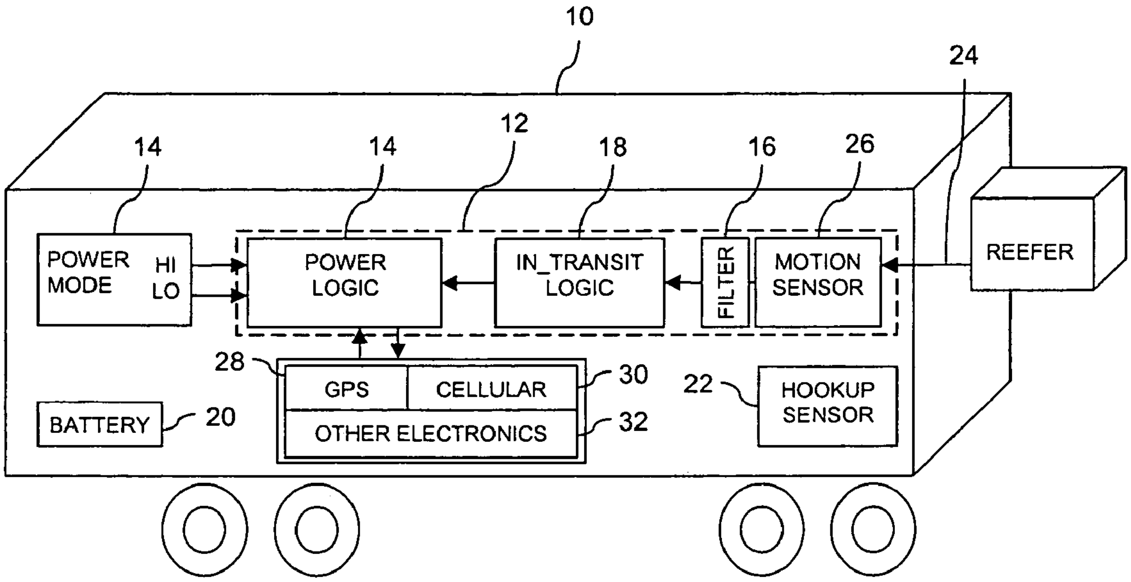
FIG. 1 is a high level diagram of a trailer and monitoring electronics.

Turning attention now to FIG. 1, there is shown a mobile asset such as a trailer 10 and associated electronics in which the present invention may be implemented. The electronics includes a controller 12, power control logic 14, motion filter 16, In_Transit logic 18, a battery 20, hook-up sensor 22, reefer sensor 24, motion sensor 26, Global Positioning System (GPS) receiver 28, cellular data modem 30, and other electronics 32.

The controller 12 is generally responsible for collecting location, status and other information from sensors located on the trailer 10. It also uses the cellular modem 30 for reporting such information to a central asset manager system (not shown in FIG. 1). For example, the GPS 28 may receive information concerning the location of trailer 10. The controller 12 reads GPS location data and periodically sends messages via the cellular modem 30 to an asset management tracking system that is operated by the owner and/or other entity responsible for the trailer 10.

The controller 12 may also receive inputs from other sensors such as door sensors, wheel sensors, temperature sensors and the like indicating the status of other aspects of the trailer 10. Only a few exemplary sensors are shown in FIG. 1, and the exact configuration of all of the status sensors is not critical to the operation of the present invention. As will be understood shortly, the controller 12 should receive at least position information such as a GPS 28, and an input from a motion sensor 26, such as a vibration sensor.

The controller 12 has other functions such as entering a low power mode when the trailer 10 enters a certain state, such as when the trailer 10 is not moving. The low power mode is intended to allow the controller 12 to continue to operate off the power provided only by local battery 20. This mode is needed at certain times, such as when the trailer 10 is parked in a storage yard or otherwise not tethered to a tractor. In this instance, the controller 12 uses stored software or firmware procedures for logic circuits such as power logic 14, motion filter 16, and In_Transit logic 18 to control whether it will continue to operate in a high power mode or enter a low power mode.

While it was mentioned that GPS 28 could be used to determine location, it should be understood that other navigation systems can be used in lieu of a GPS 28. For example, Loran or other radio navigation sensors, or wireless systems such as third generation cellular systems that provide location information can be used. Similarly, although the data communication system was described as using a cellular modem 30, it should be understood that other wireless data communication systems that are satellite or terrestrial based may also be used.

Figure 2:
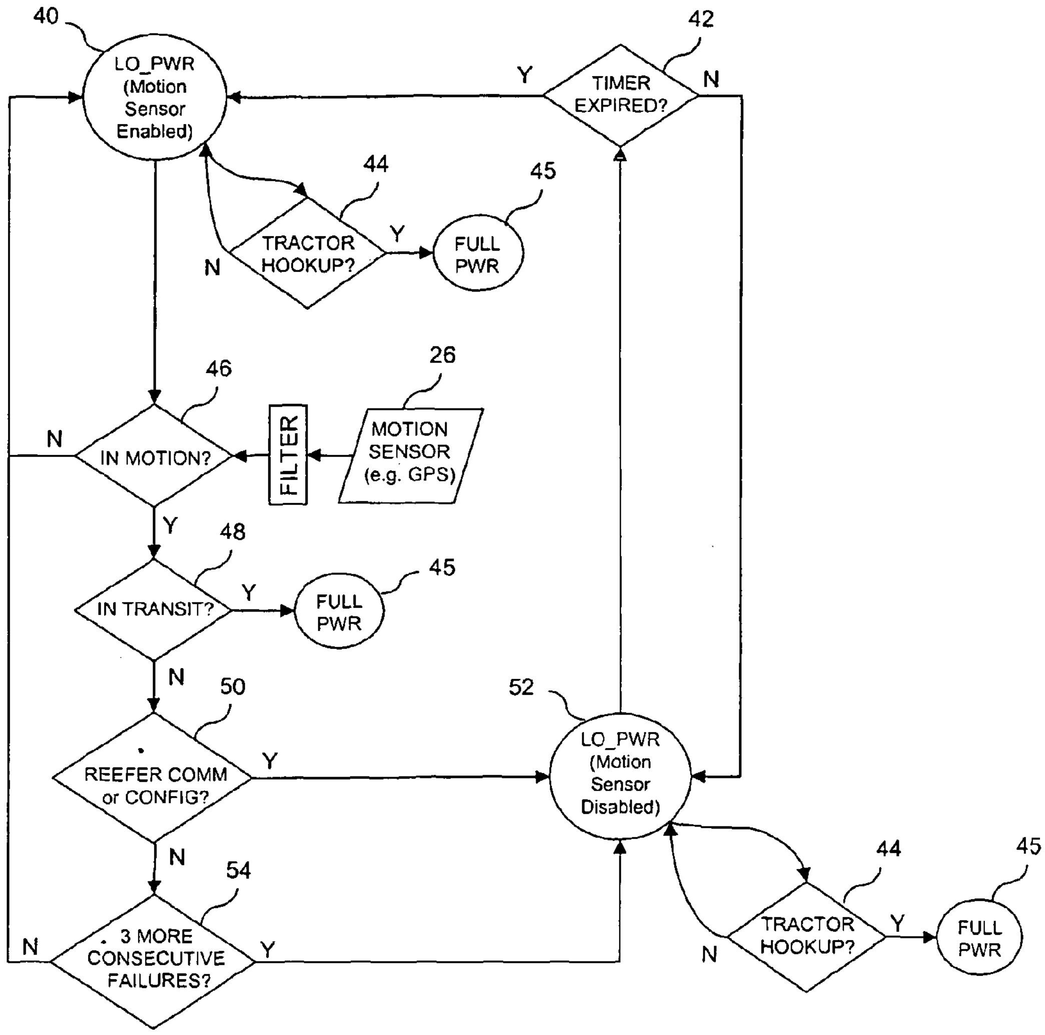
FIG. 2 is a flow diagram of a power management process according to the present invention.

Turning attention to FIG. 2, it will now be described how the controller 12 executes a motion filtering algorithm in order to avoid entering a high power mode (e.g. continuing to activate a GPS 28 to take position fixes) even when the motion sensor is only being triggered by a local vibration source such as a refrigeration unit.

Beginning in a first state 40, the unit is placed in a low power mode with the motion sensor 26 enabled. The unit may then be caused to leave the low power mode upon any one of a number of events. The first such event occurring could be event 44 when a tractor is hooked up to the trailer 10. Such an event may be detected by a hook-up sensor 22 shown in FIG. 1. In this instance, a state 45 will be entered in which the controller 12 and other electronics 32 will be permitted to operate in a high power mode, since tractor power is now available.

However another event can cause the system to enter an In_Motion state 46. Such an event can be caused by receiving a trigger from a motion sensor 26 or in other ways. In the case of being trigger by the motion sensor 26, the raw motion sensor outputs will be first subjected to filtering 16.

Figure 3:
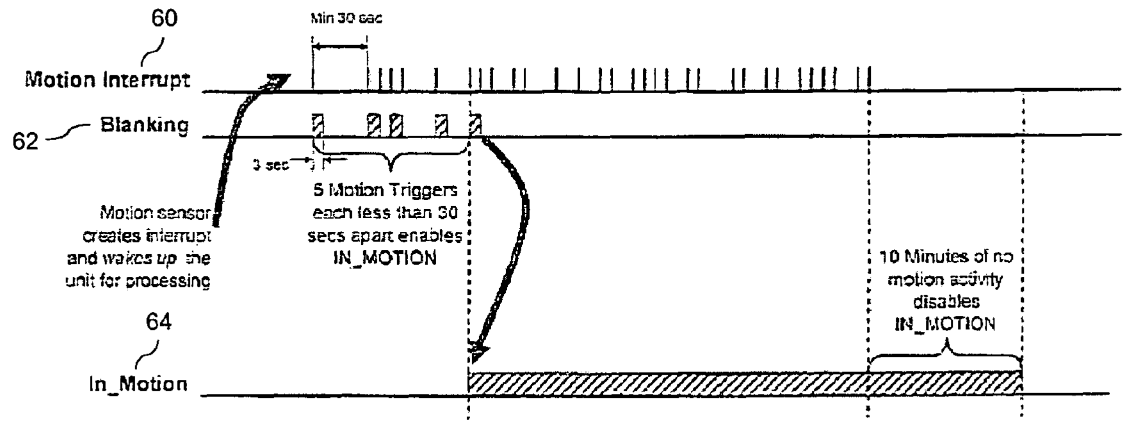
FIG. 3 is a logic signal diagram of a motion filtering algorithm.

A preferred embodiment of motion filtering 16 is shown in more detail in FIG. 3. For example, the direct motion sensor output may be provided by a motion interrupt signal 60, used as an interrupt driven input to the controller 12. The interrupt then awakens the controller 12 from a low power mode 40 for further processing. A blanking interval 62 may be applied to raw motion interrupt outputs, that may, for example, mask the output for a predetermined period of time such as three seconds which will limit the update rate for a motion trigger counter. Once the three seconds has passed the motion interrupt is reenabled. If further motion interrupts occur, a counter is incremented and the process is repeated. If a predetermined period of time, such as 30 seconds, passes without further motion interrupt then the motion count is reset to zero. If the motion count reaches a predetermined number such as 5 (which would require a minimum of 15 seconds of motion because of the blanking interval 62) then the In_Motion logic signal 64 is set to a true state. This indicates that the unit is experiencing sufficient "motion" to warrant a further check for distance movement.

Figure 4:
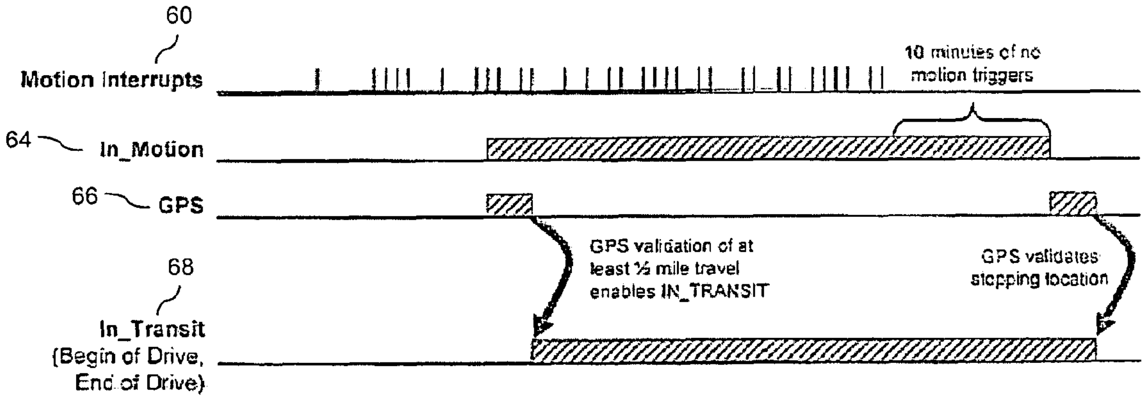
FIG. 4 is a logic signal diagram of an In_Transit filtering algorithm.

In this case, the unit then enters a state 48 called the In_Transit mode. In this state, shown in FIG. 4, assertion of the In_Motion signal 68 causes the GPS unit to take a position fix. The GPS position fix is taken to determine if the In_Motion signal 68 being in the true state is actually due to distance movement of the trailer 10, or instead due to a false trigger for some other reason, such as vibration. A last known stationary location of the unit is also maintained in memory be controller 12. This last known stationary location is compared to a new location as determined by the GPS receiver at time T1 when In_Motion was asserted true. If this difference in location exceeds a system defined threshold (typically ½ a mile), then the system determines that the trailer 10 has actually moved to a new location, and that the In_Transit state 68 was asserted true due to actual motion. However, if a GPS position fix cannot be obtained at time T1, or if the GPS location is obtained but less than the transit distant threshold, (i.e., less than ½ mile of movement has been detected), then the GPS is turned off and the system assumes that the In_Transit trigger was false, and remains in the In_Motion state. The system can then retest for In_Transit at various predetermined retry intervals as long as the In_Motion state remains asserted.

Once the In_Motion state transitions to false (for example, when the motion sensor has not generated any motion triggers for 10 minutes), then the GPS unit is operated again to obtain a new stationary location. If the GPS fix attempt is unsuccessful, no retries are performed since the probability of success following a failure is low unless there is movement. So if an In_Transit state is determined, such as by GPS validation of at least ½ of a mile travel, then a full power mode will be entered in state 45, however if GPS validation fails, then another state 50 will be entered.

Returning attention to FIG. 2, state 50 next attempts to determine if further information about the presence of a reefer unit can be determined in a number of different ways. First, a reefer unit itself may provide a logic status signal to the controller 12 indicating that it is operating. If this is the case, processing can then proceed to state 52 in which the motion sensor will be disabled and Power Logic 14 will switch to low power mode. This is because an assumption is made that the triggering of the motion sensor or vibration sensor was due to the reefer unit operating. Thus with the motion sensor disabled in state 52, processing proceeds to state 42, in which low power mode will be maintained until such time as either a timer times out or tractor power is introduced, i.e. in state 44.

Returning attention to state 50, if a reefer status output signal is not available, a configuration data bit may instead indicate that a reefer is attached to the trailer. If this is the case, an assumption is made that it was the reefer unit that was triggering the motion sensor. In this case state 52 will also be entered.

If however, neither a reefer status signal nor configuration data bit are available, further processing can take place to derive whether the reefer caused the In_Transit failure. For example, a state 54 is entered, in which consecutive failures to enter In_Transit are evaluated. As one example, if there have been fewer than, for example, three consecutive failures, processing returns to state 40 where low power mode is entered with the motion sensor still enabled. However, if three or more consecutive failures of an In_Transit detection have occurred, processing continues to state 52 where low power mode is entered with the motion sensor disabled. At this point, it is assumed that some other external event (which is not the reefer) is causing repeated triggering of the motion sensor without an actual distance movement of the trailer. Therefore, the motion sensor should be disabled to prevent entering full power mode and/or further triggering of the GPS unit to take position fixes. Thus once state 52 is entered (low power mode and motion sensor disabled) processing will stop until a future event occurs such as the expiration of a predetermined amount of time or the application of tractor power.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for use in controlling the state of a power supply in a mobile asset comprising:

a motion sensor for sensing vibration or motion, the motion sensor outputting one or more in-motion signals;

a memory for storing a last known stationary location of the asset;

a location device for identifying a current location of the asset; and a power controller for:

determining whether said asset is in an In_Motion state based on said in-motion signals, causing said location device to identify a current location of the asset if it is determined that said asset is in an In_Motion state; and determining, if it is determined that said asset is in an In_Motion state, whether the asset is in an In_Transit state by comparing the current location of the asset and the last known stationary location, and selecting a power consumption mode for the power supply based on the determination.

2. An apparatus as claimed in claim 1, further comprising:

a filtering module for filtering the motion sensor in-motion signals, wherein determining whether the asset is in an In_Motion state comprises determining that a predetermined number of filtered in-motion signals are detected in a predetermined period of time.

3. An apparatus as claimed in claim 2, wherein said filtering module:

receives the motion sensor output as an interrupt signal; and applies blanking intervals to the interrupt signal, thereby creating a filtered motion sensor output.

4. An apparatus as claimed in claim 1, wherein the power controller determines the asset is in transit if the difference between the current location and the last known stationary location exceeds a predetermined threshold.

5. An apparatus as claimed in claim 1, further comprising, if the controller determines that said asset is in an In_Motion state and determines that said asset is not in an In_Transit state:

said power controller determines whether a refrigeration unit is operating or present; and said power controller disables the motion sensor if the power controller determines that a refrigeration unit is operating or present.

6. An apparatus as claimed in claim 4, wherein the power controller determines whether a refrigeration unit is operating by checking a refrigerator unit status output signal or determines whether a refrigerator is present by checking a configuration data bit that indicates whether a refrigerator unit is present on the asset.

7. An apparatus as claimed in claim 1, wherein the power controller re-enables the motion sensor after a predetermined period of time or if a tractor is connected to said asset.

8. An apparatus as claimed in claim 1, further comprising, if said power controller determines that a refrigeration unit is not operating or not present, said power controller disabling the motion sensor after a predetermined number of determinations have been made that the asset is in an In_Motion state but not in an In_Transit state.

9. An apparatus as claimed in claim 6, wherein said power controller selects a predetermined power consumption mode if a tractor is connected to the asset, regardless of the determinations of whether the asset is in an In_Motion state or in an In_Transit state.

10. A method for use in controlling the state of a power supply in a mobile asset comprising:

storing a last known stationary location of the asset;

enabling a motion sensor on the asset;

monitoring the motion sensor output;

determining whether the asset is in an In_Motion state based on the motion sensor output;

if it is determined that said asset is in an In_Motion state, identifying a current location of the asset using a location device, and determining whether the asset is in an In_Transit state by comparing the current location of the asset with the last known stationary location; and selecting a power consumption power consumption mode for the power supply based on the in-transit determination.

11. The method as claimed in claim 10, further comprising filtering the motion sensor output;

wherein determining if the asset is in an In_Motion state is based on the filtered motions sensor output.

12. The method as claimed in claim 11, wherein determining whether the asset is in an In_Motion state based on the filtered motion sensor output comprises:

determining if a predetermined number of filtered in-motion signals are detected in the filtered motion sensor output in a predetermined period of time.

13. The method as claimed in claim 11, wherein filtering the motion sensor output comprises:

receiving the motion sensor output as an interrupt signal; and applying blanking intervals to the interrupt signal, thereby creating a filtered motion sensor output.

14. The method as claimed in claim 10, wherein determining whether the asset is in an In_Transit state by comparing the current location of the asset with the last known stationary location comprises determining if the difference between the current location and the last known stationary location exceeds a predetermined threshold.

15. The method as claimed in claim 10, further comprising, if it is determined that said asset is in an In_Motion state and determined that said asset is not in an In_Transit state:

determining whether a refrigeration unit is in operation or present on the asset; and disabling the motion sensor if it is determined that a refrigeration unit is in operation or present.

16. The method as claimed in claim 15, wherein determining whether a refrigeration unit is operating comprises checking a refrigerator unit status output signal and wherein determining whether a refrigerator is present comprises checking a configuration data bit that indicates whether a refrigerator unit is present on the asset.

17. The method as claimed in claim 15, further comprising:

re-enabling the motion sensor after a predetermined period of time or upon the occurrence of an external trigger event.

18. The method as claimed in claim 17, wherein said external trigger event is the connection of a tractor to the asset.

19. The method as claimed in claim 15, further comprising, if it is determined that a refrigeration unit is not operating or not present, disabling the motion sensor after a predetermined number of determinations have been made that the asset is in an In_Motion state but not in an In_Transit state.

20. The method as claimed in claim 10, further comprising:

determining whether a tractor is connected to the asset;

selecting a predetermined power consumption mode if a tractor is connected to the asset, regardless of the determinations of whether the asset is in an In_Motion state or in an In_Transit state.

* * * * *